Dec. 12, 1933.  W. C. MERRILL, JR  1,939,597
PROJECTION APPARATUS
Filed Oct. 16, 1928

Inventor
W. C. Merrill Jr
Johnston & Jennings  Attorneys

Patented Dec. 12, 1933

1,939,597

UNITED STATES PATENT OFFICE 1,939,597

PROJECTION APPARATUS

William C. Merrill, Jr., Birmingham, Ala.

Application October 16, 1928. Serial No. 312,918

3 Claims. (Cl. 88—16)

My invention relates to apparatus for producing the illusion of action in a still picture and has for its object the provision of apparatus of the character designated which shall be simple of design and operation and capable of producing a wide variety of optical effects.

A further object of my invention is to provide apparatus for producing the illusion of action in a still picture and which shall be especially adapted as an advertising display medium.

A still further object of my invention is to provide apparatus for projecting a varicolored still picture on a screen, together with other projection apparatus cooperating with the first mentioned apparatus and adapted to project varicolored moving shadows on the still picture to produce the illusion of movement in the still picture, whereby the subject-matter and effect of the picture may be readily and inexpensively changed.

Apparatus for producing the illusion of motion in a still picture has heretofore been proposed, but such apparatus with which I am familiar has included the cutting out of those portions of the picture wherein movement is desired and the interposition of mechanism for projecting moving pictures or shadows in the cut out portion. This method of producing the illusion of motion has necessarily been somewhat complicated of design and has limited such displays to relatively small pictures. It is accordingly one of the predominant features of my invention that I am enabled to produce the illusion of motion in a still picture without any cutting out of the picture and am thus enabled to adapt my invention for use with displays of relatively large size, as well as small size, making it especially useful in bill board advertising displays.

In carrying out my invention, I utilize a still picture which may be painted on, or projected on, a suitable screen and on this picture, or on selected parts thereof, I project shadows moving across the picture in the direction in which the motion is desired to appear. Where the invention is utilized as an advertising display, I preferably project the still picture onto the rear of a translucent screen so that the picture may be viewed from the front of the screen, and independently project the moving shadows on selected parts of the picture. By this means I am enabled to readily and inexpensively provide an automatically operative action picture wherein the subject-matter may be readily and inexpensively changed.

Apparatus embodying features of my invention is illustrated in the accompanying drawing, forming a part of this application, wherein Fig. 1 is a diagrammatic view illustrating the method of carrying out my invention;

Figure 1:
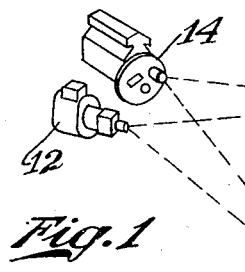
Figure 3:
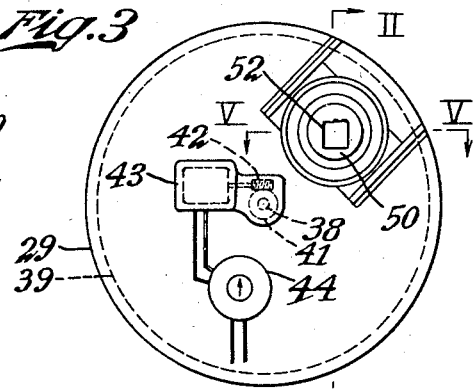
Fig. 3 is a front view of the apparatus shown in Fig. 2.
Figure 2:
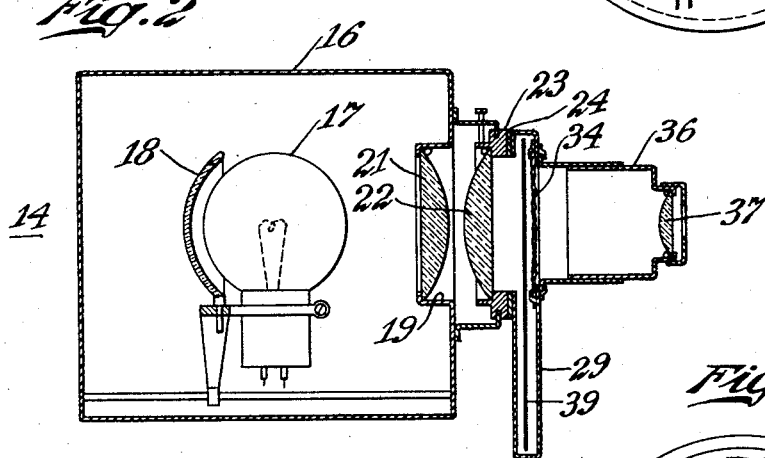
Fig. 2 is a sectional view of appartus utilized in projecting the moving shadows on the screen and taken along the line II—II of Fig. 3.

Referring to the drawing for a better understanding of my invention, I show in Fig. 1 a translucent screen 10 upon which a picture 11 is projected from the rear by means of a suitable projection apparatus 12. The picture 11, for the sake of illustrating my invention, indicates a waterfall, though it will be apparent from the further description of my invention that a wide variety of subjects for the picture might be employed.

In order that the picture 11 may appear to be in motion, and the water fall appear to be in action, I utilize a separate projection apparatus 14 adapted to project moving shadows on the picture, said shadows moving preferably only across that portion of the picture which represents the waterfall, whereupon it appears to be in action.

The apparatus 14 comprises a casing 16 having a lamp 17 mounted therein with a reflector 18 mounted at the rear of the lamp. The apparatus is provided with the usual front opening 19 in which is mounted condensing lenses 21 and 22 through which light rays from the lamp 17 pass onto the screen 10. Suitably mounted on the front of the casing 16 and supporting the lens 22 is a frame 23 to which is secured an additional frame 24 provided with lateral slots 25 and having a central opening 26 through which the light rays pass.

Fitting within the slots 25 is a plate member 27 having a central opening 28. A circular frame forming a casing 29 and having an eccentric opening 30 therein, smaller than the opening 28, is slidingly positioned next to the plate member 27 by means of a plurality of bolts 31 which surround the opening 30 and pass through the opening 28. At the rear of the opening 28 is a plate 32 to which the bolts 31 are secured by means of nuts 33. By the mounting described, the circular casing 29 may be swung to any desired angular position with respect to the opening 19 in the frame 16 and is held in such position by the frictional engagement of the plate 32 and casing 29 with the plate 27. In the front of the casing 29 is a transparent window 34 which is made of glass having a wavy surface, so as to break up and refract the light rays passing therethrough. Directly in front of the window 34 is a telescoping extension 36 in which is mounted a projection lens 37.

Centrally of the casing 29 is an axle 38 upon which is mounted a transparent disk 39, the disk being preferably made of mica, or similar material, and adapted to rotate within the casing 29. The axle 38 carries a gear 41 and cooperating with the gear 41 is a worm 42 driven by a motor 43. The motor 43 is provided with a variable rheostat 44 whereby it may be regulated to rotate the disk at any desired speed. The disk 39 is detachably mounted on the axle 38 by means of a collar 46 and a set screw 47 whereby different disks may be employed with the apparatus, according to the effect desired to be produced.

Painted, or otherwise appearing on the disk 39, in a disorderly array, are splotches 51 adapted to produce shadows on the picture 11. Where the picture 11 is in colors, as is preferably the case, the splotches 51 are varicolored to correspond to the predominant colors of the picture. In the example shown, where a waterfall is to appear in action, the splotches are in varying shades and tints of blue to correspond with the blue of the waterfall. Where the predominant color of the picture is other than that described, the splotches are made to correspond to the predominant color of the picture. Furthermore, the splotches 51 are not limited to the general design of shape shown but vary according to the illusion sought to be produced thereby, all of which will readily suggest itself to those skilled in the art.

In order that the illusion of motion shall prevail only in certain portions of the picture 11, I provide an opaque screen 50 which is cut out at 52 to permit light from the apparatus 14 to be projected only on selected portions of the picture. In the example shown, the slot 52 is made to correspond to the outline of the waterfall in the picture 11 whereby the moving shadows only appear on the waterfall.

Figure 6:
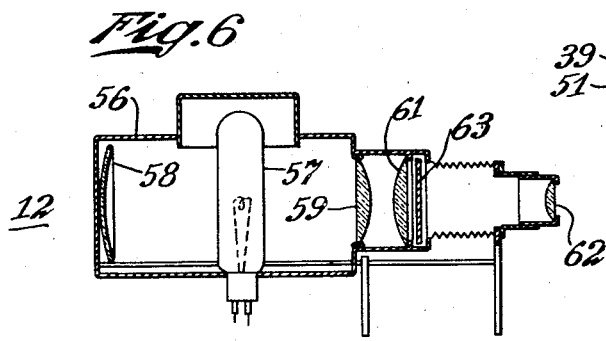
Fig. 6 is a sectional view of a well known type of projection apparatus which may be employed for projecting the still picture on the screen.
Figure 4:
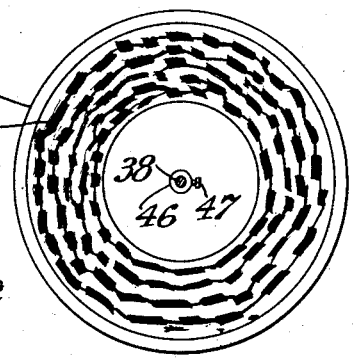
Fig. 4 is a view of a disk employed in the apparatus shown in Figs. 2 and 3 and utilized for projecting moving shadows on the screen.
Figure 5:
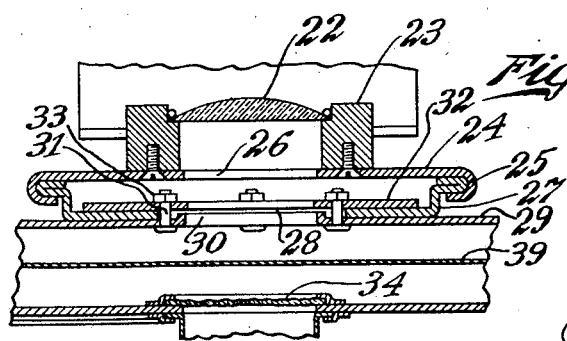
Fig. 5 is a sectional view taken along the line V—V of Fig. 3.

Any suitable apparatus may be employed to project the picture 11 onto the screen 10. The apparatus 12, as shown in Fig. 6, is of a well known make and comprises a casing 56 having a lamp 57 mounted therein with the usual reflector 58 mounted to the rear of the lamp. In the front of the casing are the usual condensing lenses 59 and 61 and a projection lens 62. Between the lenses 61 and 62 is a slot for inserting a slide 63 carrying the picture 11 to be projected on the screen.

From the foregoing description, the operation of my improved apparatus will be apparent. The picture 11 is projected on the screen 10 and a disk 39 having appropriately colored and shaped splotches thereon is then mounted in the casing 29 and is rotated by the motor 43 before the lenses 21 and 22. The casing 29 is swung around on the plate member 27 so that the shadows move across the picture in the direction in which it is desired for the motion to appear while the speed of the rotation is controlled by the rheostat 44 thereby giving the illusion of motion in the proper direction and at the proper speed. In the example shown, the casing 29 is so positioned with respect to the opening 19 that the movement of the shadows produced by the disk 39 is from the upper part of the picture downwards and the water appears to be falling. It will be apparent that, with other subjects of pictures, it might be desired to have the motion appearing in an upward direction with respect to the picture 11 or transversely thereof, in which case the casing 29 is swung to the required position to give such direction of movement. The screen 50 is provided with an appropriately shaped cut out which is so positioned as to effect projection of the moving shadows only on selected parts of the picture.

Having once set the apparatus in operation, it will continue to operate automatically and indefinitely without further attention. If it is desired to change the subject-matter of the picture or the action effect produced it is only necessary to change the slide in the projection apparatus 12 and select and adjust the appropriate disk to produce the illusion of action sought with such picture.

From the foregoing it will be apparent that I have devised an improved means for producing the illusion of motion in a still picture which is simple of design and inexpensive of operation and which is effective to produce a wide variety of optical effects.

While I have shown my invention in but one form, it will be obvious to those skilled in the art that it is not so limited but is susceptible of various changes and modifications without departing from the spirit thereof, and I desire therefore that only such limitations shall be placed thereupon as are imposed by the prior art, or as are specifically set forth in the appended claims.

What I claim is:

1. In projection apparatus, a housing enclosing a light source and having an opening in one side thereof through which light is projected, a circular casing mounted on the housing in front of the opening eccentrically thereof and angularly movable with respect thereto, said circular casing having a projection window therein in line with the opening in the housing, and a rotary disk journalled centrally of the circular casing and adapted to project irregularly shaped moving shadows through the opening.

2. In projection apparatus, a housing enclosing a light source and having an opening therein through which light rays are projected, condensing lenses in the opening, a circular casing mounted on the outside of the housing in front of the opening and eccentric thereto, said circular casing being provided with a projection window in line with the opening in the housing, a circular disk mounted to rotate concentrically of the casing in front of the opening and adapted to effect a projection of irregularly shaped moving shadows, and means for angularly adjusting the casing about the opening.

3. In projection apparatus, a housing enclosing a light source and having an opening therein through which light rays are projected, condensing lenses in the opening, a circular casing mounted on the outside of the housing in front of the opening and eccentric thereto, a circular disk mounted to rotate concentrically of the casing in front of the opening and adapted to effect a projection of irregularly shaped moving shadows, and means for angularly adjusting the casing about the opening, and a projection lens mounted in the casing in front of the opening.

WILLIAM C. MERRILL, Jr.